(12) United States Patent
Lee et al.

(10) Patent No.: US 7,348,936 B2
(45) Date of Patent: Mar. 25, 2008

(54) DISPLAY DEVICE AND IMAGE PROCESSING METHOD THEREOF

(75) Inventors: Jang-woo Lee, Suwon (KR); Sang-hak Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 686 days.

(21) Appl. No.: 10/807,299

(22) Filed: Mar. 24, 2004

(65) Prior Publication Data

US 2004/0218098 A1 Nov. 4, 2004

(30) Foreign Application Priority Data

Apr. 15, 2003 (KR) .................. 10-2003-0023786

(51) Int. Cl.
*G09G 5/00* (2006.01)

(52) U.S. Cl. .................. 345/3.1; 345/1.1; 345/1.2; 348/565

(58) Field of Classification Search .......... 345/3.1, 345/1.1, 1.2; 348/565
See application file for complete search history.

(56) References Cited

U.S. PATENT DOCUMENTS

| | | | |
|---|---|---|---|
| 4,800,426 A | | 1/1989 | Glenn |
| 4,890,162 A | * | 12/1989 | McNeely et al. ...... 375/240.21 |
| 5,065,243 A | | 11/1991 | Katagiri |
| 5,130,800 A | | 7/1992 | Johnson et al. |
| 5,208,660 A | | 5/1993 | Yoshida |
| 5,283,653 A | | 2/1994 | Citta |
| 5,900,916 A | | 5/1999 | Pauley |
| 6,088,064 A | * | 7/2000 | Rumreich et al. ........... 348/564 |
| 7,004,835 B2 | * | 2/2006 | Baerlocher .................. 463/16 |

FOREIGN PATENT DOCUMENTS

| | | |
|---|---|---|
| DE | 43 43 075 | 6/1994 |
| EP | 0 551 168 | 7/1993 |
| JP | 3-153177 | 7/1991 |
| JP | 10-191199 | 7/1998 |
| JP | 10-191379 | 7/1998 |
| WO | WO 96/01020 | 1/1996 |

OTHER PUBLICATIONS

International Search Report for Application No. PCT/US 95/06661.

* cited by examiner

*Primary Examiner*—Richard Hjerpe
*Assistant Examiner*—Leonid Shapiro
(74) *Attorney, Agent, or Firm*—Staas & Halsey LLP

(57) ABSTRACT

A display device having an A/D (Analog/Digital) converter receiving a signal from a personal computer (PC) and converting the signal into a digital signal a decoder receiving external input signals from an external signal inputter such as a TV or a Video player that decodes the external input signals into the digital signal, and a video processor that performs a PIP (Picture In Picture) signal process displaying one of the PC signal converted and the decoded external input signal as a main screen and the other one as a sub main screen, thereby enabling the converted PC signal and the decoded external input signal to be displayable on a display. The display device also has a memory storing different display property values depending on the external signal inputter setup; and a controller controlling the PIP signal process of the video processor based on an external signal, reading the display property values from the memory, and controlling the decoded external input signal to be converted depending on the read display property values.

5 Claims, 2 Drawing Sheets

DISPLAY DEVICE AND IMAGE PROCESSING METHOD THEREOF

CROSS-REFERENCE TO RELATED APPLICATIONS

This application claims the benefit of Korean Patent Application No. 2003-23786, filed Apr. 15, 2003, in the Korean Intellectual Property Office, the disclosure of which is incorporated herein by reference.

BACKGROUND OF THE INVENTION

1. Field of the Invention

The present invention relates to a display device, and more specifically, to a display device with an A/D (Analog/Digital) converter converting a personal computer (PC) signal received from a PC into a digital signal, a decoder digitalizing an external input signal received from an external signal inputter such as a TV, or a video player and decoding the digitalized external input signal, and a video processing handler which inputs the converted PC signal or the decoded external input signal performing a PIP (Picture in Picture) signal process which displays one of the converted PC signal and the decoded external signal for a main screen and the other for a sub main screen, thereby processing the converted PC signal and the decoded external signal to be displayable on a display.

2. Description of the Related Art

A PC monitor can receive a signal generated from a PC through an external input terminal and display the received signal after an image processing is being done, and also display input signals transmitted from external input sources such as a TV, a video player, a DVD player, or a DTV, and the like, through the external input terminal after the image processing is being done.

The PC monitor has an additional function that is a PIP function displaying one main screen with more than one sub main screen at the same time, or a PBP (Picture By Picture) function which divides one screen into two and displays the divided screens at the same time.

Thus, a user can display a monitor screen as the main screen and a TV or a Video screen as the sub main screen at the same time, or vice versa, thereby displaying screens having different input sources in one screen at the same time.

In operating the PIP function or the PBP function, display properties, such as contrast, color, brightness, sharpness, and the like, are evenly applied to the input signals to be displayed on one screen without differentiating between the main screen or the sub main screen. However, considering that the PC usually displays still images while the external input screen usually displays moving images, the external input screen and the PC screen should be separately controlled to respectively optimize the displaying properties of the screens.

Thus, having divided a display into the main screen and the sub main screen, various methods exist for improving the quality of the sub main screen or an external input screen and controlling the display properties, when one of the PC screen and the external input screen is the main screen and the other is the sub main screen.

However, such methods require extra hardware to be added, like a new circuit with a complex process, and are improved undifferentiatedly without considering various aspects of various input signal sources.

SUMMARY OF THE INVENTION

Accordingly, it is an aspect of the present invention to provide a display device having display properties improved by considering various aspects of various external input sources, and easy image processing methods without adding extra hardware.

Additional aspects and/or advantages of the invention will be set forth in part in the description which follows and, in part, will be obvious from the description, or may be learned by practice of the invention.

The foregoing and/or other aspects of the present invention are achieved by providing a display device having an A/D (Analog/Digital) converter receiving a PC signal from a PC and converting the PC signal into a digital signal, a decoder receiving external input signals from an external signal inputter such as a TV or a Video player and converting the received external input signals into a digital signal and decoding the digital signal, and a video processor which performs a PIP (Picture In Picture) signal process displaying one of the converted PC signal and the decoded external input signal as a main screen and the other one as a sub main screen, thereby enabling the converted PC signal and the decoded external input signal to be displayable on a display. The display device also has a memory storing display property values differently depending on the external signal inputter; and a controller controlling the PIP signal process of the video processor based on an external signal, reading the display property values from the memory, and controlling the decoded external input signal to be converted depending on the read display property values.

According to an aspect of the invention, the display apparatus includes a user interface setting up a type of the external signal inputter.

According to an aspect of the invention, the user interface can setup the display property values.

According to an aspect of the invention, the user interface includes an OSD (On Screen Display) button.

According to an aspect of the invention, the user interface can setup the display property values.

According to an aspect of the invention, the user interface has an OSD button.

According to another aspect of the present invention, the above and/or other aspects may be also achieved by providing an image processing method of the display apparatus having an A/D (Analog/Digital) converter receiving a PC signal from a PC and converting into a digital signal; a decoder receiving external input signals from an external signal inputter such as a TV or a Video player and converting into a digital signal and decoding it, and a video processor which performs a PIP (Picture In Picture) signal process displaying one of the PC signal converted and the decoded external input signals as a main screen and the other one as a sub main screen, thereby enabling the converted PC signal and the decoded external input signal to be displayable on a display, including storing display property values depending on the external signal inputter; selecting the external signal inputter; reading the display property values of the selected external signal inputter; and converting the decoded external input signal following the read display property values.

According to an aspect of the invention, the storing the display property values depending on the external signal inputter is done by a user's selection.

According to an aspect of the invention, the storing the display property values and the selecting the external signal inputter are done by an OSD (On Screen Display) button provided on a monitor.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
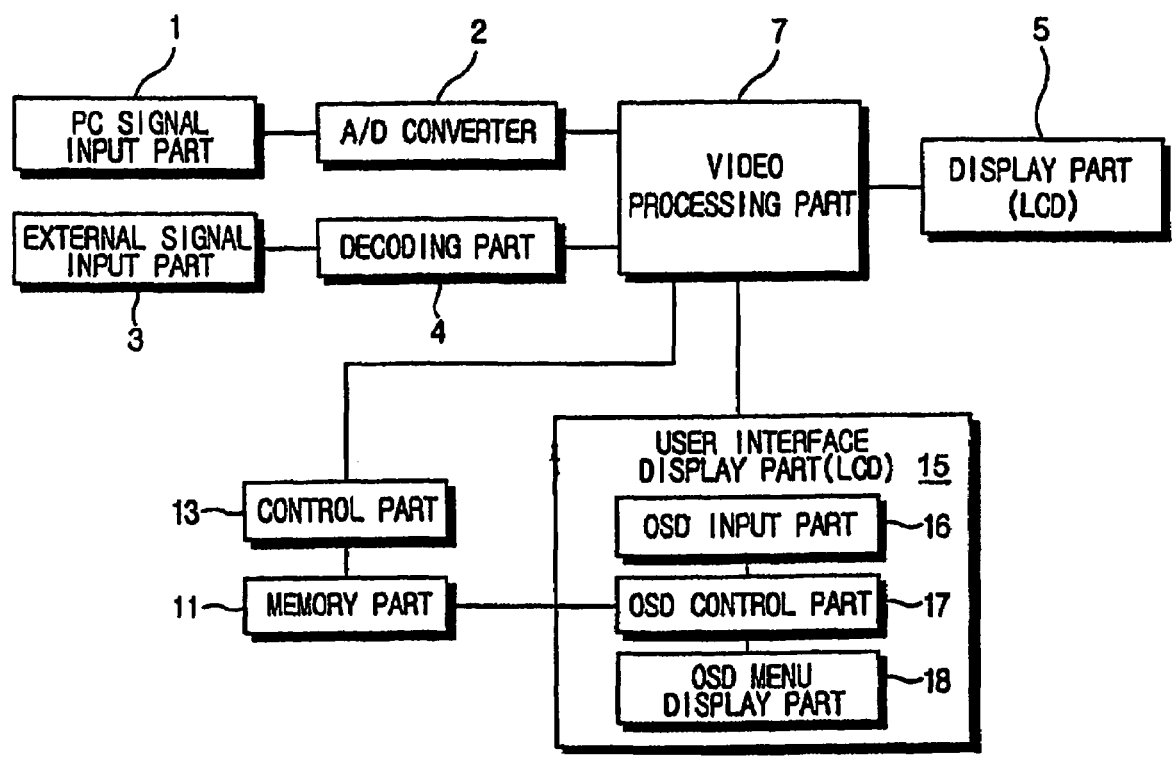
FIG. 1 is a control block diagram of a display apparatus according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a block diagram of a display device according to an embodiment of the present invention. As shown therein, the display device includes a PC signal input part 1 receiving a signal from a personal computer (PC); an A/D (Analog/Digital) converter 2 converting an analog PC signal into a converted digital signal; an external signal inputter 3, such as a TV, a video player, or a DVD player, or DTV, selectively connected to external input terminals of the display device; a decoding part 4 converting the external input signal into a digital signal and decoding the converted signal. A video processor 7 performs a PIP (Picture In Picture) signal process, which sets one of the converted digital signal and the decoded external input signal as a main screen and the other as a sub main screen and packages the converted digital signal and the decoded external input signal to be displayable on a display 5.

In this embodiment, the display device also has a memory 11 in which display properties depending on the type of the external signal inputter 3, such as brightness, contrast, sharpness, color, and the like, are stored, and a controller 13 which controls the PIP signal process to set one of the PC signal and the external input signal as the main screen and the other as a sub main screen in the video processor 7. Herein, the controller 13 reads the display properties from the memory 11, and controls the video processor 7 depending on the read display properties.

The display device also includes a user interface 15. A user selects features through the user interface 15 to set up whether or not to use the PIP signal process, the type of the external signal input and/or the display properties.

Herein, the video processor 7 handles a plurality of input signals to be processed by performing the PIP signal process, and supplies the PIP signal processed input signals to the display 5, when the PIP signal process is selected by a user. The video processor 7 also performs the PIP signal process that converts the display properties depending on the type of the selected external signal inputter 3, and then outputs the plurality of input signals after combining them as one signal.

The memory 11 stores the display properties such as brightness, contrast, sharpness, color, and the like depending on the type of the external signal inputter 3.

The controller 13 transmits a signal according to the PIP signal process to the video processor 7 when the PIP signal process is selected in the user interface 15. Also, the controller 13 reads the display properties stored in the memory 11 and transmits them to the video processor 7 when the type of the external input signal and its display properties are selected in the user interface 15.

That is, the controller 13 controls the video processor 7 to perform the PIP signal process according to the user's choice. Also, the controller 13 reads the selected display properties stored on the memory 11 and transmits them to the video processor 7, and allows the video processor 7 to convert the external input signal and the PC signal to signals usable by the display 5.

In this embodiment, the user interface 15 has an On Screen Display (OSD) input part 16 which the user can manually set whether or not to use the PIP signal process, the type of the external signal inputter 3, and/or desired display properties; an OSD menu display 18 that displays selection information on the display 5 to enable the user to selectively enter a value for display property settings through the OSD input part 16; and an OSD controller 17 that stores the value entered through the OSD input part 16 in the memory 11. The OSD menu display 18 displays the selection information to permit the user to set up whether or not to use the PIP signal process, the type of the external signal inputter, and/or the display properties.

Herein, the OSD menu display 18 has at least one menu that the user can select from to choose whether or not to use the PIP signal process according to the present invention, select a type of the external signal inputter, or setup specific display properties of the selections, and the OSD controller 17 sends an OSD generating signal to the controller 13 to output the selected menu through the display 5.

Then, if the user selects a setup value in the menus displayed in the display 5 using the OSD input part 16, such as an OSD button provided on a monitor, the OSD controller 17 stores the setup value in the memory 11. It is understood that the user interface 15 could also work with a touch screen.

The display properties can be setup manually by the user using the user interface 15, and may be pre-setup with an arbitrary or default value.

Figure 2:
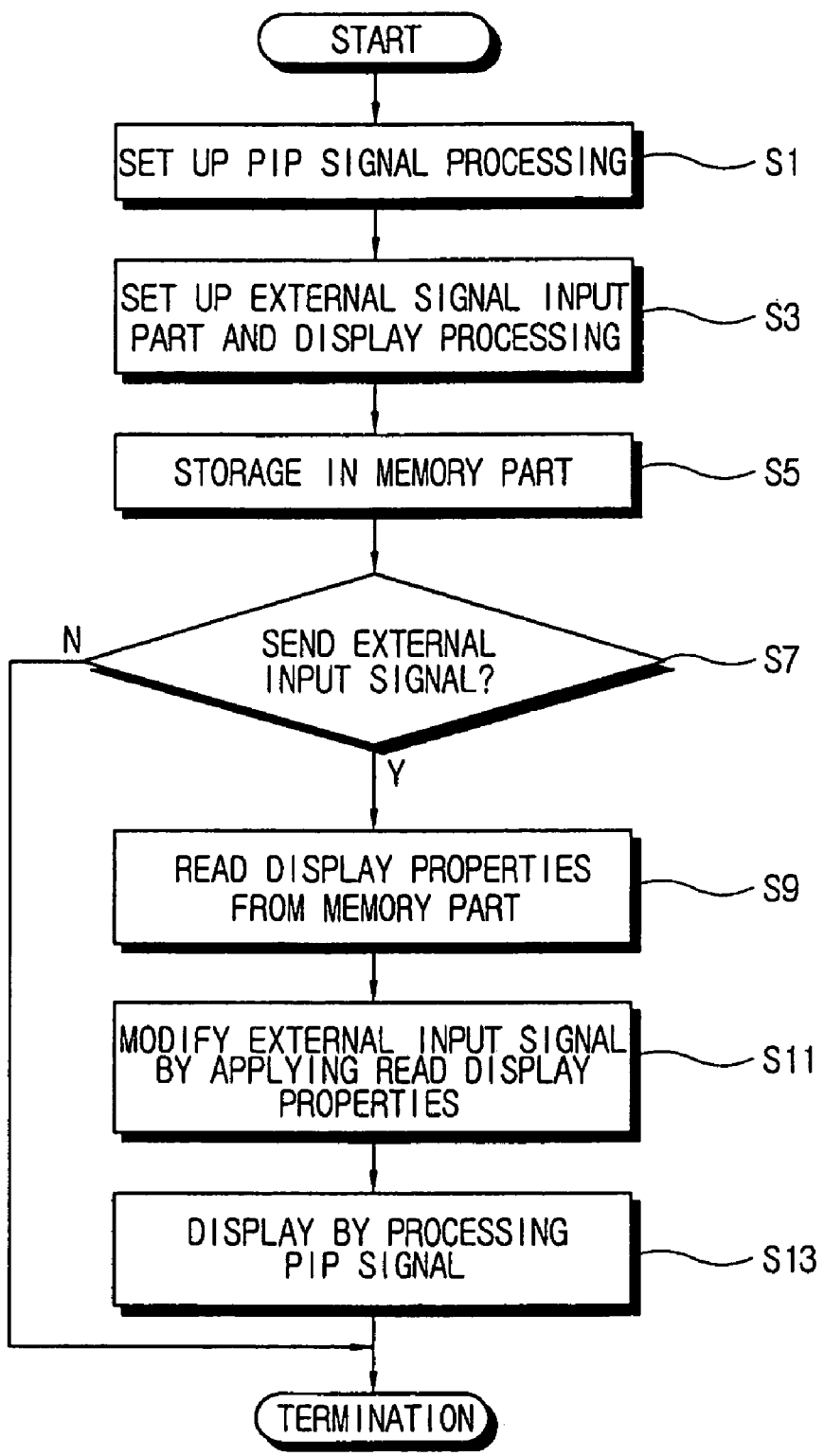
FIG. 2 is a control flow chart of an image processing method according to an embodiment of the present invention.

FIG. 2 illustrates a control sequence of an image processing method according to the present invention. As shown, the user sets up the PIP signal processing at operation S1, and the external signal inputter 3 to be used and the desired or default display properties at operation S3, and then the user interface part 15 stores the selected external signal inputter and the selected display properties in the memory 11 at operation S5.

As described above, the display properties can be setup by the user's selection, or the user can select pre-setup values for the display properties.

After the initial setup is complete, the controller 13 checks whether or not the PC signal or the external input signal is sent at operation S7, and if the external input signal is sent, the controller 13 reads the display properties from the memory 13 at operation S9. At operation S11, the read display properties are applied to the external input signal, thereby modifying the external input signal. The controller 13 controls the PC signal, and the external input signal to which the setup display properties are applied depending on the external signal inputter 3 selected to the display 5 after the PIP signal processing is done. Thus, the display properties corresponding to the external signal inputter 3 and the PC signal may be different when the images are displayed in PIP.

It is understood that the present invention may be implemented without the A/D converter when the PC signal is digital. Additionally, the display device of the present invention may include an OSD with menu choices coupled with a touch screen to control the PC signal display properties as well as the external signal display properties.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A display device comprising:
   an A/D (Analog/Digital) converter receiving and converting an analog personal computer (PC) signal into a digital signal;
   a decoder receiving and decoding external input signals from an external signal inputter and outputting the external input signals as a digital signal;
   a video processor which performs a PIP (Picture In Picture) signal process displaying one of the converted PC signal and the decoded external input signal as a main screen and the other one as a sub main screen, thereby enabling the converted PC signal and the decoded external input signal to be displayable on a display;
   a memory storing different display property values setup depending on the external signal inputter;
   a controller controlling the PIP signal process of the video processor based on an external signal, reading the display property values from the memory, and controlling the decoded external input signal depending on the read display property values; and
   a user interface setting up a type of the external signal inputter.

2. The display apparatus according to claim 1, wherein the user interface sets up the display property values.

3. The display apparatus according to claim 2, wherein the user interface comprises an OSD (On Screen Display).

4. An image processing method of the display apparatus having an A/D (Analog/Digital) converter receiving a PC signal from a PC and converting into a digital signal; a decoder receiving external input signals from an external signal inputter and converting into the digital signal and decoding it, and a video processor which performs a PIP (Picture In Picture) signal process displaying one of the PC signal converted and the decoded external input signal as a main screen and the other one as a sub main screen, thereby enabling the converted PC signal and the decoded external input signal to be displayable on a display, the image processing method comprising:
   storing display property values depending on the external signal inputter;
   selecting the external signal inputter;
   reading the display property values of the selected external signal inputter; and
   converting the decoded external input signal following the read display property values,
   wherein the storing the display property values depending on the external signal inputter is done by a user's selection.

5. The image processing method of the display apparatus according to claim 4, wherein the storing the display property values and the selecting the external signal inputter are done by an OSD (On Screen Display) button provided on a monitor.

* * * * *